US005861473A

United States Patent [19]
DeCrosta et al.

[11] Patent Number: 5,861,473
[45] Date of Patent: Jan. 19, 1999

[54] METHOD FOR CLEANING ELASTOMERIC ARTICLES

[75] Inventors: Michelle A. DeCrosta, Bethlehem, Pa.; Indradat Jagnandan, West Orange, N.J.

[73] Assignee: Schering Corporation, Kenilworth, N.J.

[21] Appl. No.: 460,818

[22] Filed: Jun. 1, 1995

Related U.S. Application Data

[63] Continuation of Ser. No. 244,849, Jun. 15, 1994, Pat. No. 5,550,211, which is a continuation-in-part of Ser. No. 810,754, Dec. 18, 1991, abandoned.

[51] Int. Cl.$^6$ ........................................... C08F 6/28
[52] U.S. Cl. .................... 528/490; 528/480; 585/833; 585/868
[58] Field of Search .................. 528/480, 502, 528/503, 490; 585/833, 868

[56] References Cited

U.S. PATENT DOCUMENTS

| | | | |
|---|---|---|---|
| 3,899,398 | 8/1975 | Cole et al. | 201/2.5 |
| 4,749,522 | 6/1988 | Kamarei | 554/8 |
| 4,824,570 | 4/1989 | Bethuel et al. | 210/511 |
| 4,842,743 | 6/1989 | Yoshida et al. | 210/634 |
| 4,871,828 | 10/1989 | Blind et al. | 528/44 |
| 5,167,883 | 12/1992 | Takemasa et al. | 264/28 |
| 5,233,021 | 8/1993 | Sikorski | 528/491 |
| 5,481,058 | 1/1996 | Blackwell et al. | 585/833 |
| 5,530,049 | 6/1996 | Dee et al. | 524/424 |
| 5,550,211 | 8/1996 | DeCrosta et al. | 528/480 |
| 5,756,657 | 5/1998 | Sawan et al. | 528/487 |

FOREIGN PATENT DOCUMENTS

| | | |
|---|---|---|
| 2001202 | 4/1990 | Canada . |
| 2638098 | 4/1990 | France . |
| 3935405 | 5/1990 | Germany . |
| 3938877 A1 | 5/1991 | Germany . |

OTHER PUBLICATIONS

Paper presented by M. A. DeCrosta, A.F. Rynaski, B.E. Richter and J. L. Ezzell at the 1991 FACCS Conference on Oct. 7, 1991, Anaheim California, entitled The Use of Supercritical Fluid Extraction (SFE) and Chromatography (SFC) in the Analysis of Transdermal Matrix Patches, 20 pages.

Paper presented by A.F. Rynaski, B.E. Richter, J. L. Ezzell and M.A. DeCrosta at the Symposium on Pharmaceutical and Biomedical Analysis, Boston, Massachusetts, Apr. 29, 1991, entitled The Use of SFC and SFE in the Preparation and Analysis of Pharmaceutical Transdermal Matrix Patches, 14 pages.

Paper by A. Figazette, M. McLoughlin, R. Renfrow and T. Rossi., Analysis for Extractables From Nitrile Rubber Components in Metered Dose Inhalers, Pharmaceutical Analysis Department, SmithKline Beecham Pharmaceuticals, King of Prussia, Pennsylvania, was presented at the Symposium, "Regulatory Issues in Aerosol Drug Development", Jun. 12–14, 1991 in Arlington Virginia by the University of Kentucky College of Pharmacy, 19 pages.

In Supercritical Fluid Extraction and Chromatography, edited by Bonnie A. Charpentier and Michael R. Sevenants, ACS Symposium Series 366 (1988), by B. Wright et al., in Chapter 3: "Analytical Supercritical Fluid Extraction Methodologies", pp. 44–62; and by R. T. Marentis in Chapter 7 "Steps to Developing a Commercial Supercritical Carbon Dioxide Processing Plant", pp. 127–143.

U.S. Environmental Protection Agency Method 8310 — Polynuclear Aromatic Hydrocarbons, pp. 8310-1 to 8310-13.

"Processing of Polymers with Supercritical Fluids" by Val Krukonis, Polymer News, 1985, vol. 11, pp. 7–16.

Anal. Chemistry, 1991, 63, pp. 2371–2377.

Biotechnology Progress, vol. 2, No. 1, Mar. 1986, pp. 29–39.

M. Taguchi, T. Hobo and T. Maeda, Evaluation and Application of a Supercritical Fluid Extraction System using Capillary Supercritical Fluid Chromatography, Journal of High Resolution Chromatography, vol. 14, Feb. 1991, pp. 140–143.

S. Sethi et al., Impact of Extractable Testing on MDI Development Programs, Journal of Biopharmaceutical Sciences, (1992), 3(1/2), pp. 63–68.

R. H. Dalby and P. R. Byron, Metered-Dose Inhalers Containing Flammable Propellants: Perspectives and Some Safety Evaluation Procedures, Pharmaceutical Technology, Oct. 1991, pp. 54–66.

Supelco, Inc. GC/HPLC Bulletin 773D, GC and HPLC Analyses of Polynuclear Aromatic Hydrocarbons, Supelco Inc., Bellefonte, PA 16823–0048, 1983, 4 pages.

CA111(17):152345q.
CA110(19):171960g.
CA109(16):135032b.
CA109(9):72333c.
CA109(4):24507r.
CA108(9):73925p.
CA108(7):52449w.
CA104(25):223476b.
CA102(9):79194x.
CA97(16):134281d.
CA112(7):53970d.
CA111(19):172661t.
CA110(7):56213d.
CA109(17):147995f.
CA109(10):75630h.
CA109(1):2942b.
CA108(17):146078b.

(List continued on next page.)

*Primary Examiner*—Rabon Sergent
*Attorney, Agent, or Firm*—Joseph T. Majka

[57] ABSTRACT

A method for cleaning elastomeric articles comprising contacting the elastomeric article with at least one supercritical fluid under conditions and for a time sufficient to remove the phtalates and/or polynuclear aromatic hydrocarbons (PAHs) contained therein. Elastomeric articles having a reduced phtalate and/or PAH content prepared by the above method are also claimed. Such elastomeric articles having reduced phtalate contents can be utilized as gaskets, valves, seats, flaps or plugs in metered dose delivery devices such as aerosols for demanding medicinal and pharmaceutical uses.

22 Claims, No Drawings

OTHER PUBLICATIONS

CA107(15):133045t.
CA105(3):23291w.
CA111(22):195652e.
CA110(22):195390x.
CA104(4):24980m.
CA71(22):103637h.
CA113(2): 7155q.
CA112(18):171483v.
CA112(18):171431b.
CA112(8):57164s.
CA109(18):152169u.
CA105(10):90485a.
CA99(16):129082b.
CA115:160036n.

Encyclopedia of Polymer Science and Engineering, vol. 16, Styrene Polymers to Toys, John Wiley and Sons, New York, 1989, Under "Supercritical Fluids", pp. 368, 369 and 387.

Kirk–Othmer Encyclopedia of Chemical Technology, $3^{rd}$ Edition, Supplemental Volume, John Wiley and Sons, New York, 1984, Under "Supercritical Fluids" pp. 872–877.

D.H. Ender, "Elastomeric Seals," Chemtech, Jan. 1986, pp. 52–56.

METHOD FOR CLEANING ELASTOMERIC ARTICLES

The present application is a continuation of U.S. application Ser. No. 244,849, filed Jun. 15, 1994, now U.S. Pat. No. 5,550,211, which was the United States national application corresponding to International Application No. PCT/US 92/10742, filed Dec. 17, 1992 and designating the United States, which PCT application was in turn a continuation-in-part of U.S. application Ser. No. 07/810,754, filed Dec. 18, 1991, now abandoned.

BACKGROUND

Certain elastomeric articles, ie. gaskets, valves and seats used in aerosol containers, are designed as part of the container for the efficacious delivery of pharmaceutically active compounds, ie. medicaments. As a matter of cost and convenience, such articles are derived using elastomeric materials such as elastomeric rubber and the like, specifically formulated with ingredients that enable the article to meet numerous demanding toxicological, chemical, and physical requirements. For example, gaskets and valves made of rubber are typically formulated with about six to twelve ingredients, including monomers, polymers, organic solvents, organic plasticizers, antioxidants, antiozonants, curing agents, accelerators, pigments, tackifiers, reinforcing materials and inorganic fillers such as carbon black. Nearly all cured or finished articles will inherently contain small amounts of residual components derived from these ingredients. These inherent residual components or impurities are not neccessary for performance of the article but can potentially interact with the medicament or other excipients in the formulation, leading to reduced pharmaceutical dosing. Such impurities could also interact with the container, causing it to malfunction, such as by blocking a nozzle orifice.

A paper by A. Figazette et al., Analysis for Extractables From Nitrile Rubber Components in Metered Dose Inhalers, Pharmaceutical Analysis Department, SmithKline Beecham Pharmaceuticals, King of Prussia, Pa., was presented at the Symposium, "Regulatory Issues in Aerosol Drug Development", Jun. 12–14, 1991 in Arlington Va. by the University of Kentucky College of Pharmacy. Figazette et al stated that contamination of pharmaceutical aerosols by substances leached from elastomeric valve assemblies in metered dose inhalers is a potentially serious problem. The authors present evidence that numerous extractables could be detected in valves from various suppliers, demonstrating a need for cleaner valve rubbers with fewer leachable extractants. One class of impurities is known as the polynuclear aromatic hydrocarbons (PNAs or PAHs). Another class of impurities is known as non-PAHs, including phthalates derived from plasticizers employed during processing. Presently, conventional methods for removing PAHs and non-PAHs from rubber articles involve liquid-solid extraction and refluxing using either conventional solvents or fluorocarbon type solvents (eg. freons). However, these conventional methods are deemed unsatisfactory for preparing purified elastomeric articles using the newer, environmentally safer fluorohydrocarbons propellants such as HFC-134A, HFC-226a and HFC-227, for the following reasons. First, these conventional methods have the disadvantage of incurring high expenses for special handling and safety precautions, and for special buildings, rooms and equipment due to the explosive nature of the newer propellants, necessitating the need to use explosion-proof equipment. Second, these conventional methods have the further disadvantage of superficially cleaning primarily the outer surface of the article, leaving impurities in the interior of the article. French patent publication 2638098 describes particulate or powder materials using supercritical fluid extraction, using solvents such as carbon dioxide. Such particulates and powders can subsequently be converted into a finished article. This reference fails to teach the purification of elastomeric articles, but rather of powders and particulates, using supercritical fluids.

Clearly, it would be desirable to provide an improved method for cleaning elastomeric articles by removal of the impurities contained therein, particularly for highly demanding pharmaceutical and medicinal uses. It would also be desirable to provide a method for preparing such articles which would meet govenmental regulatory requirements (ie. Food and Drug Administration). Furthermore, it would also be desirable to provide a method for cleaning elastomeric articles that is occupationally and environmentally safer, simpler, more rapid and less expensive than known conventional methods.

SUMMARY OF THE INVENTION

The present invention is directed towards a method for cleaning elastomeric articles comprising contacting the elastomeric article with at least one supercritical fluid under conditions and for a time sufficient to remove the phthalates and/or polynuclear aromatic hydrocarbons (PAHs) contained therein. Selected phthalates include dibutyl phthalate or diisooctyl phthalate. Preferably the supercritical fluid is carbon dioxide.

The present invention is also directed toward an elastomeric article having a reduced phthalate and/or PAH content prepared by the above method. Preferably the elastomeric article is made of rubber, preferably nitrile rubber. Also preferred is that the elastomeric article is a rubber gasket, valve, seat, flap or plug, such as those employed in metered dose delivery devices, which use chlorofluorohydrocarbons or fluorohydrocarbons as propellants. The propellant can be a chlorofluorohydrocarbon such as P-11 (trichlorofluoromethane) or a fluorohydrocarbon such as HFC-134A, HFC-226A or HFC-227.

One advantage of the present invention is that it provides an elastomeric article for medicinal or pharmaceutical use whose phthalate and/or PAH content is significantly lower than similar articles cleaned by conventional procedures.

A second advantage of the present invention is that it provides a simpler and faster method for removing phthalate and/or PAH impurities from an elastomeric article, compared to conventional procedures.

A third advantage of the present invention is that it provides a method for removing phthalate and/or PAH impurities from elastomeric articles that is less expensive than by other known procedures.

A fourth advantage of the present invention is that it provides an occupationally and environmentally safer method for removing phthalate and/or PAH impurities from elastomeric articles, compared to conventional procedures.

DETAILED DESCRIPTION OF THE INVENTION

Throughout the specification, the terms "purifying" and "cleaning" are used interchangeably.

As defined by Gessner G. Hawley, The Condensed Chemical Dictionary, 10th Edition, Van Nostrand Reinhold Co., New York, (1981), 1135 pp., the term "elastomer" as originally defined by Fisher (1940), refers to synthetic thermosetting high polymers having properties similar to those of vulcanized natural rubber, namely, the ability to be stretched to at least twice their original length and to retract very rapidly to approximately their original length when released. Among the better known elastomers are styrene-butadiene copolymer, polychloroprene (neoprene), nitrile rubber, butyl rubbers such as the non-halogenated rubbers, the chlorinated rubbers and brominated rubbers; polysulfide rubber ("Thiokol"), cis-1,4-polyisoprene, ethylene-propylene terpolymers (EPDM rubber), silicone rubber and polyurethane rubber. These can be cross-linked with sulfur, peroxides or similar agents. The term also includes uncross-linked polyolefins that are thermoplastic, generally known as TPO rubbers. Their extension and retraction properties are notably different from those of thermosetting elastomers, but they are well adapted to specific uses such as specialized mechanical products.

Also as defined by The Condensed Chemical Dictionary, above, the term "rubber" refers to any of a number of natural or synthetic high polymers having unique properties of deformation (elongation or yield under stress) and elastic recovery after vulcanization with sulfur or other cross-linking agent, which in effect changes the polymer from thermoplastic to thermosetting. The yield or stretch of the vulcanized material ranges from a few hundred to over 1000 per cent. The deformation after break, called "permanent set" is usually taken as the index of recovery. It ranges from 5 to 10% for natural rubber to 50% or more for some synthetic elastomers, and varies considerably with the state of vulcanization and the pigment loading. Representative rubbers include nitrile rubbers or neoprene, GR-S rubbers, polyisoprene, polybutadienes, and polysiloxanes.

The term "propellants" refers to both compressible and incompressible gases used to expel the contents of containers in the form of aerosols, and include freons, fluorohydrocarbons, hydrocarbon gases such as butane and propane, carbon dioxide ($CO_2$), nitrogen ($N_2$), oxygen ($O_2$) and nitrous oxide ($N_2O$).

Such elastomeric materials can be useful for preparing articles for medical or pharmaceutical use such as rubber gaskets, valves, seats, flaps, stoppers and plugs used in aerosol containers, atomizers, pump sprays, droppers and other metered dose devices. Another use for such materials would be for stoppers used to cap vials, bottles, infusion bags, syringes, blood collection tubes and parenteral containers. And yet another use for such materials would be for septa used in analytical equipment such as injection ports of gas chromatographs. Other elastomeric materials include those used for implantation devices such as heart valves, limb joints, breast implants, intravenous and intestinal tubing, dental retainers and pharmaceutical containers. Another application could be for devices which are contacted with the mouth such as baby nipple, toothpicks, mouthguards used in sports, scuba diving mouthpieces, feed tubes, tracheal tubes and thermometers.

An apparatus for supercritical extraction is made up of an extraction cell, preferably cylindrical, which is housed in a chamber for controlling temperatures and pressures. At least one supercritical fluid (ie. extracting mobile phase), such as $CO_2$, is pumped into the extraction cell, through a pressure regulating restrictor to maintain back pressure and into a vessel which serves as a trap. As the supercritical fluid passes through the elastomeric article containing phthalate and/or PAH impurities, the supercritical fluid removes the phthalate and/or PAH impurities from the elastomeric article, leaving behind an elastomeric article whose phthalate and/or PAH content is significantly reduced. As the supercritical fluids containing the phthalate and/or PAH impurities leave the chamber, the fluids transform into a gas, which can be passed through or injected (ie. bubbled) into a trapping vessel.

The use of supercritical fluid extraction for analytical purposes is known. For example, in Supercritical Fluid Extraction and Chromatography, edited by Bonnie A. Charpentier and Michael R. Sevenants, ACS Symposium Series 366, by B. Wright et al., in Chapter 3: "Analytical Supercritical Fluid Extraction Methodologies" (1988), the authors teach that several polycyclic aromatic hydrocarbons (PAHs) were extracted from a chromatographic resin, ie. XAD-2, superficially spiked with several PAHs, using carbon dioxide at 325 bar and 50° C. for 7 minutes. However, this reference fails to describe a process for removing phthalate and/or PAH impurities from an elastomeric article whose phthalates and/or PAHs have been integrated throughout the entire matrix of the elastomer article as a result of mixing, heating and curing steps involved in preparation of the elastomeric article.

The elastomeric article can be contacted with at least one supercritical fluid under conditions effective to extract phthalate and/or PAH impurities from the elastomeric article. The contacting of the article with the supercritical fluid can be carried out at temperatures ranging from about ambient to below the temperature resulting in degradation of the elastomer, such as from about 25° C. to about 300° C., preferably from about 25° C. to about 50° C., more preferably from about 30° to 35° C. The pressure at which the article can be contacted with the supercritical fluid can range from about $5.1 \times 10^6$ pascals (Pa) (ie., 50 atmospheres-atm) to about $40.5 \times 10^6$ Pa (ie., 400 atm), preferably from about $10.1 \times 10^6$ Pa to about $40.5 \times 10^6$ Pa (ie., 100 to about 400 atm). The elastomeric article should be contacted with at least one supercritical fluid for a time sufficient to reduce the phthalate and/or PAH impurities to the desired level. Preferably the contacting is carried out for greater than one hour, more preferably for about two hours or more, most preferably about 4 hours or more. Generally, the longer contacting times with the supercritical fluid(s) allows for higher extraction of phthalates and/or PAHs.

The supercritical fluid employed in the present process can be one or more of any of those described in U.S. Pat. No. 4,749,522. Representative extracting (solvating) mobile phase components include the elemental gases such as helium, argon, nitrogen and the like; inorganic compounds such as ammonia, carbon dioxide, nitrous oxide, water, and the like; and organic compounds. Suitable organic compounds include C-1 to C-5 alkanes such as propane and butane; alkyl halides such as monofluoromethane, carbon tetrachloride, chloroform, methylene chloride; aromatics such as xylene, toluene and benzene; aliphatics such as C-5 to C-20 alkanes including hexane, heptane and octane; C-1 to C-10 alcohols such as methanol, ethanol, propanol, butanol and isopropanol; ethers or acetone. Where more than one supercritical fluid is employed, the supercritical fluid employed in the larger amount, ie. greater than 50% on a volume basis, is considered to be the main solvent. If three or more supercritical fluids are employed, the main solvent will be that making up the largest proportion in the mixture. Co-solvent supercritical fluids which can supplement and tend to modify the solvating properties of the main supercritical fluid are employed in lower amounts relative to the main supercritcal fluid, generally from about one to less than 50% on a volume basis, preferably from about one to about 10% relative to the main supercritical fluid. The co-solvent supercritical fluid employed in the present process should be compatible with the main supercritical fluid and also be capable of at least partially dissolving some of the impurities being extracted. Suitable co-solvents for use in conjunction with the supercritical fluid include any of those cited above for the main supercritical fluid or mixtures thereof.

One representative method for determining the phthalate and/or PAH content of an article cleaned by the present process is as follows. The elastomeric article to be tested is immersed or refluxed for a certain period of time with a solvent or solution matched for the environment in which the elastomeric article will be used. For example, elastomeric gaskets and seals used in aerosols can be immersed for about one to three weeks in an aerosol propellant, such as Freon 11, Freon 12, HFC-134A, HFC-226A or HFC-227. After the immersion period, the amount of phthalates and/or PAHs in the resultant solution (ie. propellant or residue thereof) is determined. Generally, the fewer phthalates and/or PAHs found in the resultant solution, the purer or "cleaner" is the elastomeric article. Similarly, the greater the amount of phthalates and/or PAHs found in the resulting solution corresponds to a higher content of phthalate and/or PAH impurities in the elastomeric article.

Phthalate impurities which can be extracted from an elastomeric article include those of the formula $C_6H_4(COOR)_2$ wherein R represents C-1 to C-12 alkyl such as such as for example methyl, ethyl, propyl, isopropyl, butyl, isobutyl, tert-butyl, pentyl, hexyl, octyl, isooctyl, decyl and the like. Other non-PAH impurities which can also be removed with the present process include 2-mercaptobenzothiazole (2-MCBT), N-cyclohexyl-2-benzthiazyl sulphenamide (CBS), nitrosamines, residual oligomers and certain plasticizers such as waxes, esters, stearates and phthalates such as dioctyl phthalate.

PAH impurities which can be extracted from an elastomeric article with the present process include those designated in U.S. Environmental Protection Agency Method 8310—Polynuclear Aromatic Hydrocarbons, pp 8310-1to 8310-13:

acenaphthene, acenaphthylene, anthracene, benzo(a) anthracene, benzo(a)pyrene, benzo(b)pyrene, benzo(e) pyrene, benzo(b)fluoranthene, benzo(ghi)perylene, chrysene, benzo(k)fluoranthene, dibenz(a,h)acridine, dibenz (a,j)acridine, dibenzo(a,h)anthracene, dibenzo(c,g) carbazole, dibenzo(a,e)pyrene, dibenzo(a,h)pyrene, dibenzo (a,i)pyrene, fluoranthene, fluorene, indeno(1, 2, 3-cd) pyrene, 3-methyicholanthrene, naphthalene, perylene, phenanthrene, pyrene or triphenylene.

After the immersion period is completed, impurities in the resultant solution can be analyzed using conventional analytical procedures, such as liquid chromatography, capillary chromatography, gas chromatography, and the like. Representative procedures to analyze for impurities in the resultant solution are provided below. Other analytical procedures such as supercritical fluid extraction (SFE) can be employed to analyze the solvent or propellant, especially where a particular impurity cannot be satisfactorily detected by conventional procedures.

Analytical Procedure No. 1. Analysis for Phthalates

A pressurized aerosol can is cooled in a freezer for one hour. The freon propellant contained therein is slowly vented from each can via a slow incision made at the top of the can. Following the complete removal of the freon propellant, the valve assembly is removed and discarded. Each can is then rinsed with one milliliter (mL) of dichloromethane containing 7.3 mg/mL of N-tetradecane, which serves as a volume indicator (ie. internal standard). The resultant dichlormethane extract is then injected into and analyzed using a gas-chromatographic/mass spectroscopic system.

Analytical Procedure No. 2. Liquid chromatography with Fluorescence Detection for Analyzing PAH This Food and Drug Administration (FDA) validated procedure uses a flow injection analysis (FIA) system made of a high performance liquid chromatography pump, an auto-injector, a fluorescence detector (filter or monochromator) set at the absorption maximum of anthracene at 250 nanometers (nm) and emission maximum at 397 nm, or use Kodak Wrattan filters No. 30, 34 or 39 or equivalent as emission filters, and chart recorder. The mobile phase is acetonitrile set at a flow rate of one milliliter per minute. A series of standards ranging from a concentration of 5 parts per billion (ppb) to 500 ppb is prepared using anthracene in acetonitrile. From the standards, a response curve is determined by plotting the response generated by the fluorescence detector versus varying concentrations of the anthracene standards. The sample, pressurized aerosol can is cooled in a dry ice/methanol bath and the top of the can is removed. The contents of the can and rinses of the valve assembly and empty can are filtered into a volumetric flask. After the propellant has evaporated, the volumetric flask is diluted to volume with acetonitrile or methylene chloride. The resulting solution is analyzed on the FIA for anthracene and the results are quantitatively measured by comparison with the standard response curve.

Analytical Procedure No. 3. Gas chromatography for Analyzing PAHs

This Environmental Protection Agency (EPA) procedure uses a system made of a PTE-5 QTM fused silica capillary column having dimensions of 15 meters (m) by 0.53 millimeters (mm) internal diameter (I.D.) and a flame ionization detector (FID). Helium is used as the carrier gas at a flow rate of 10 mL per minute. A series of 19 standards are prepared, each standard containing a specific PAH in methylene chloride in a concentration of 1.2 nanograms (ng) per microliter ($\mu$L). The column temperature is increased to 85° C. and held at this temperature for four minutes; then increased at a rate of 15° C. per minute to 300° C. and held for two minutes. The sample, pressurized aerosol can is cooled in a dry ice/methanol bath and the top of the can is removed. The contents of the can and rinses of the valve assembly and empty can are filtered into a volumetric flask. After the propellant has evaporated, the volumetric flask is diluted to volume with acetonitrile or methylene chloride. The resultant solution is analyzed on the gas chromatograph for the presence of any of the 19 PAHs.

It is highly desirable that the integrity of the article being cleaned of phthalates and/or PAHs is maintained. Thus, the present invention is not directed toward cleaning articles whose utility would be destroyed by exposure to supercritical fluids. For example, exposing a patch containing an adhesive to supercritical fluids would render the patch ineffective by dissolving or removing the adhesive.

In addition to removing phtalate and/or impurities, the present method has the advantage of providing an elastomeric article having a significantly reduced phthalate and/or PAH content whose physical properties are still maintained. Maintaining and verifying the retention of certain physical properties following cleaning is useful to assure proper mechanical functioning of the article. For example, a gasket or valve component can be evaluated for durometer (ie. hardness), tensile strength and elongation or compression set. Hardness can be evaluated with any suitable hardness tester with the desired sensitivity, using procedures such as described in ASTM-D-1415-68, Part-68, July 1973—International Hardness of Vulcanized Rubber or ASTM D-2240-75. Tensile strength and elongation can be evaluated with any suitable tensometer and extensometer, using procedures such as ASTM D-412-75. Compression set can be evaluated with any suitable compression set device, using procedures as described in ASTM D395-78.

EXAMPLE

Cleaning of Rubber Valve Components for
Aerosols Removal of Phthalates and PAHs a) Supercritical Fluid Cleaning Using $CO_2$ To a ten mL stainless steel extraction cell is added one gram of nitrile rubber valve components. The operating conditions for supercritical cleaning are as follows:

| | |
|---|---|
| Head Space Filler: | Helium |
| Restrictor Flow: | 500 mL/min |
| Extracting Mobile Phase (ie. supercritical fluid): | Supercritical fluid grade $CO_2$ |
| Oven Temperature: | 35° C. |
| Pressure Program: | a. $10.1 \times 10^6$ Pa (ie., 100 atm) for 2 minutes |
| | b. $20.3 \times 10^6$ Pa (ie., 200 atm) for 2 minutes |
| | c. $22.8 \times 10^6$ Pa (ie., 225 atm) for 2 minutes |
| | d. $25.3 \times 10^6$ Pa (ie., 250 atm) for 2 minutes |
| | e. $27.9 \times 10^6$ Pa (ie., 275 atm) for 2 minutes |
| | f. $30.4 \times 10^6$ Pa (ie., 300 atm) for 240 minutes |
| Total Extraction Time: | 1, 2 or 4 hours | b) Measuring Phthalates and Other Impurities

Various groups of nitrile rubber valve components are tested for phthalate impurities. One group of valve components represents the control, which receives no cleaning after manufacture of the valve component. A second group of valve components is cleaned conventionally by refluxing the valve components in Freon P11 for 72 hours, followed by air drying. A third group of valve components is cleaned using the method of a) Supercritical Fluid Cleaning Using $CO_2$, above. Each group of nitrile rubber valve components is placed into a 10 mL aerosol container and immersed in 15 g of Freon 11. The containers are sealed and maintained at 40° C. for two weeks. The containers are opened and the Freon is evaporated. The chemical residue in the container is analyzed for phthalate impurities by a suitable analytical procedure.

TABLE I

Assay of Impurities Found in Extracts From Unprocessed Rubber, Conventionally Cleaned Rubber and Supercritical Fluid (SFE) Cleaned Rubber Used for Aerosol Seals and Gaskets

| Extracted Impurity | Un-processed Rubber | Conventionally Cleaned Rubber | SFE-Cleaned Rubber | | |
|---|---|---|---|---|---|
| | | | 1 hrs | 2 hrs. | 4 hrs |
| | | μg in extract | | | |
| Cyclohexyl Isothiocyanate | 7 | <0.1 | 26 | 1 | 0.1 |
| 2,6-Di-t-butyl-4-methylpheno | <0.1 | <0.2 | <0.1 | 0.2 | <0.1 |
| 2-Cyanoethyldimethyl-dithiocarbamate | 67 | 0.1 | 71 | 4 | 0.2 |
| Dibutyl phthalate | 8 | 0.7 | 6 | <0.1 | 0.1 |
| 2,2-Methylene-bis-(4-methyl-tert-butyl phenol) | 6 | 7 | 3 | 12 | 6 |
| Octadecanoic Acid | 22 | 11 | 27 | 12 | 3 |
| Carbamodithioic Acid Ester[a] | 2 | <0.1 | <0.1 | <0.1 | <0.1 |
| Unknown A | 7 | <0.1 | 0.4 | <0.1 | <0.1 |
| Unknown B | 2 | <0.1 | 1 | <0.1 | <0.1 |
| Unknown C | 16 | 2 | 9 | 2 | 0.3 |
| Unknown D | 7 | 11 | 2 | 47 | 0 8 |
| Diisooctyl Phthalate | 28 | 9 | 6 | 3 | 0.1 |
| High boiling aliphatics | 11 | 2 | 4 | 6 | 2 |
| Total mg Detected | 183 | 43 | 155.4 | 87.2 | 19.8 |

The results in Table 1 demonstrate that of the three rubbers tested, the 4-hour SFE-cleaned rubber had the lowest amounts of extractable impurities (ie. 19.8 mg) compared with the unprocessed (183 mg) and conventionally cleaned rubbers (43 mg). Also, the 4-hour SFE-cleaned rubbers had the lowest amounts of phthalates. For example, rubbers had dibutylphthalate and diisooctyl phthalate amounts which were 7- and 90-fold lower, respectively, than the rubbers conventionally cleaned using solvent extraction with Freon 11.

TABLE II

Physical Properties of Supercritical Fluid (SFE) Cleaned Rubber Prepared from Unprocessed Rubber Used for Aerosol Seals and Gaskets

| | Change in Weight | Change in Hardness | Change in Physical Properties |
|---|---|---|---|
| Unprocessed Rubber | No change | No change | No change |
| 4 hr SFE-Cleaned Rubber | −4.00 mg | No change | No change |
| 2 hr SFE-Cleaned Rubber | −3.13 mg | No change | No change |
| 1 hr SFE-Cleaned Rubber | −2.29 mg | No change | No change |

The results in Table II demonstrate that the SFE-cleaned rubbers incurred a loss in weight, reflecting a significant loss of impurities from the rubber matrix. However, despite this significant weight loss, no change for either hardness or the physical properties of the SFE-cleaned rubbers was observed.

TABLE III

Assay of Impurities: Non-Volatile Residues and Total Polynuclear Aromatic Hydrocarbon Content (Per Anthracene Equivalents) Found in Extracts From Unprocessed Rubber, Conventionally Cleaned Rubber Used for Aerosol Seals and Gaskets

| | Non-Volatile Residues (Peak Area Counts/mg rubber) | PAH Content (ppb of PAHs/mg Rubber) |
|---|---|---|
| Unprocessed Rubber | 2024 | 10 |
| Conventional Cleaning | 747 | 7 |
| 4 hr SFE-Cleaned Rubber | 458 | 3 |
| 2 hr SFE-Cleaned Rubber | 1443 | 15 |
| 1 hr SFE-Cleaned Rubber | 13,774 | 13 |

The results in Table III demonstrate that the 4 hour SFE-cleaned rubbers had the lowest total polynuclear aromatic hydrocarbon content (ie. 3 ppb/mg rubber) as compared to either the unprocessed rubber (ie. 7 ppb/mg rubber) or the conventionally cleaned rubbers (10 ppb/mg rubber). Similarly, the 4 hour SFE-cleaned rubbers had the lowest non-volatile residues (ie. 458 area counts/mg rubber) of all the rubbers tested.

We claim:

1. A method for cleaning a vulcanized elastomeric article provided that the elastomeric article is not silicone rubber or polysiloxane wherein prior to cleaning, the vulcanized elastomeric article contained phthalate and/or PAH impurities integrated throughout its matrix, wherein the cleaned vulcanized elastomeric article has a lower phthalate and/or PAH impurity content than an equivalent vulcanized elastomeric article cleaned by refluxing in Freon P11 for 72 hours, comprising contacting the vulcanized elastomeric article with at least one supercritical fluid as an extracting mobile phase until the content of phthalate and/or polynuclear aromatic hydrocarbon (PAH) impurities contained therein is lower than that of the equivalent article cleaned by refluxing in Freon P11 for 72 hours.

2. The method of claim 1 wherein the phthalate being removed is dibutyl phthlate or diisooctyl phthalate.

3. The method of claim 1 wherein the supercritical fluid is carbon dioxide.

4. The method of claim 3 wherein the article is contacted with a supercritical fluid for about 2 hours or more.

5. The method of claim 3 wherein the article is contacted with a supercritical fluid for about 4 hours or more.

6. The method of claim 1 wherein the vulcanized elastomeric article is rubber.

7. The method of claim 1 wherein the vulcanized elastomeric article is nitrile rubber.

8. The method of claim 1 wherein the vulcanized elastomeric article is a rubber gasket, valve, seat, flap, stopper or plug.

9. The method of claim 1 wherein the the vulcanized elastomeric article is a rubber gasket, valve, seat, flap, stopper or plug for use in a metered dose delivery device.

10. The method of claim 9 wherein the the metered dose delivery device is an aerosol container.

11. The method of claim 1 wherein the the vulcanized elastomeric article is a rubber gasket, valve, seat, flap, stopper or plug for use in a metered dose delivery device containing chlorofluorohydrocarbon or fluorohydrocarbon propellants.

12. A method for cleaning a vulcanized elastomeric article wherein the elastomer is selected from the group consisting of styrene-butadiene copolymer, polychloroprene, nitrile rubber, butyl rubber, polysulfide rubber, cis-1,4-polyisoprene, ethylene-propylene terpolymers, polyurethane rubber, polyisoprene and polybutadienes, wherein prior to cleaning, the vulcanized elastomeric article contained phthalate and/or PAH impurities integrated throughout its matrix, wherein the cleaned vulcanized elastomeric article has a lower phthalate and/or PAH impurity content than an equivalent vulcanized elastomeric article cleaned by refluxing in Freon P11 for 72 hours, comprising contacting the vulcanized elastomeric article with at least one supercritical fluid as an extracting mobile phase until the content of phthalate and/or polynuclear aromatic hydrocarbon (PAH) impurities contained therein is lower than that of the equivalent article cleaned by refluxing in Freon P11 for 72 hours.

13. The method of claim 12 wherein the phthalate being removed is dibutyl phthalate or diisooctyl phthalate.

14. The method of claim 12 wherein the supercritical fluid is carbon dioxide.

15. The method of claim 14 wherein the article is contacted with a supercritical fluid for about 2 hours or more.

16. The method of claim 14 wherein the article is contacted with a supercritical fluid for about 4 hours or more.

17. The method of claim 12 wherein the vulcanized elastomeric article is rubber.

18. The method of claim 12 wherein the vulcanized elastomeric article is nitrile rubber.

19. The method of claim 12 wherein the vulcanized elastomeric article is a rubber gasket, valve, seat, flap, stopper or plug.

20. The method of claim 12 wherein the vulcanized elastomeric article is a rubber gasket, valve, seat, flap, stopper or plug for use in a metered dose delivery device.

21. The method of claim 20 wherein the metered dose delivery device is an aerosol container.

22. The method of claim 12 wherein the vulcanized elastomeric article is a rubber gasket, valve, seat, flap, stopper or plug for use in a metered dose delivery device containing chlorofluorohydrocarbon or fluorohydrocarbon propellants.

* * * * *